Patented Sept. 5, 1950

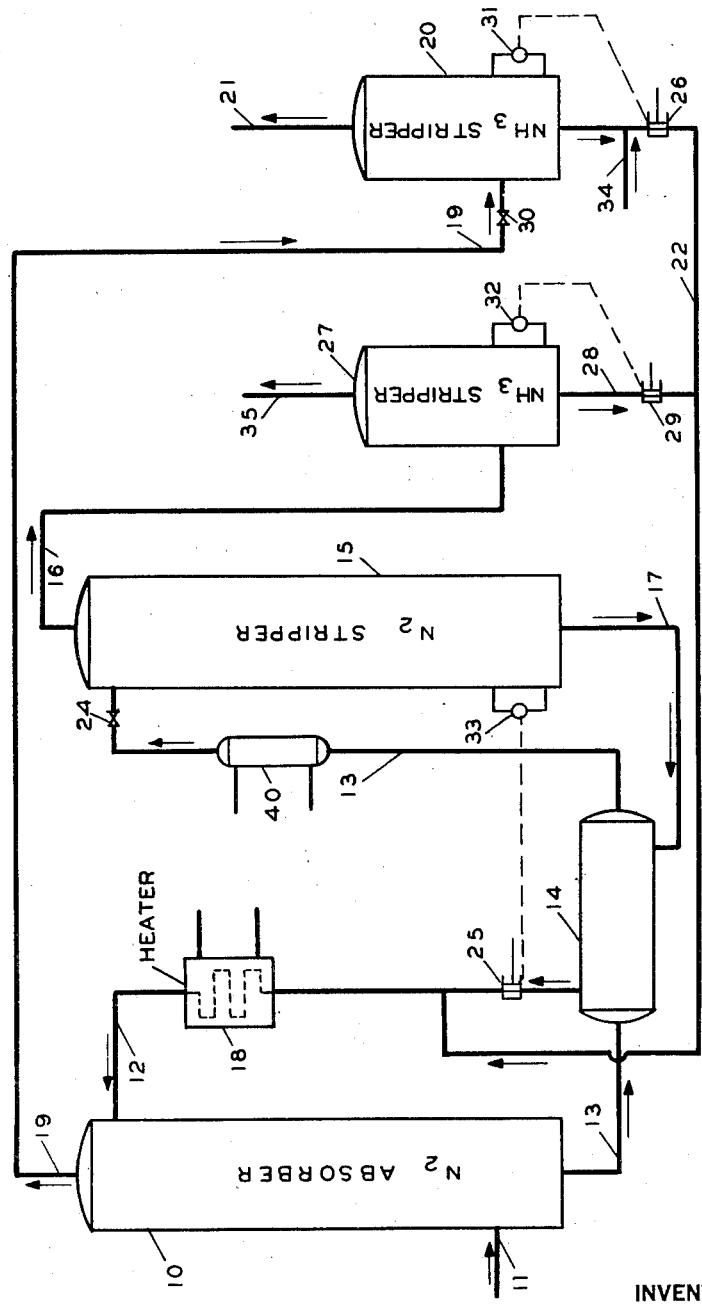

2,521,233

UNITED STATES PATENT OFFICE 2,521,233

ABSORPTION OF NITROGEN BY LIQUID AMMONIA

John W. Latchum, Jr., Bartlesville, Okla., assignor to Phillips Petroleum Company, a corporation of Delaware Application December 18, 1944, Serial No. 568,765

4 Claims. (Cl. 183—115)

This invention relates to the treatment of hydrocarbon gases. In one of its more specific aspects it relates to a method for the removal of nitrogen gas from natural hydrocarbon gases containing this inert gas in objectionable proportions.

As natural gas comes from the gas well it frequently and in fact usually contains other gases than hydrocarbons. Occasionally a well is drilled which produces largely carbon dioxide, others have been "brought in" as gas wells, the gas from which contains largely nitrogen. In most instances, however, gases produced from wells are mixtures of many different gases. A well known as a carbon dioxide well will frequently produce along with carbon dioxide, oxygen, nitrogen and even hydrogen sulfide. In a similar manner, nitrogen wells usually do not produce only nitrogen. Hydrocarbon producing wells are no exception to the rule, and they usually produce a "natural gas," impure with respect to the hydrocarbon content. These gases sometimes contain traces of oxygen, some hydrogen sulfide and mercaptan type compounds, some carbon dioxide and nitrogen. The amounts or proportions of these "impurities" vary widely. Some gases contain several percent of such materials, and a gas produced at one time in south central Kansas contained such a large proportion of nitrogen that it would burn only by the continuous application of a torch.

A natural gas containing as much as 10 to 20 per cent impurity presents serious considerations when marketing is contemplated. The presence of carbon dioxide and nitrogen lower the heating value of a gas merely by their presence while hydrogen sulfide and/or mercaptan compounds cause the gas to be corrosive and to possess a foul odor. Combustion products of the latter possess a disagreeable odor as well as being corrosive, especially when moist. The removal of the hydrogen sulfide type of compounds from natural gas to be used in domestic heating, process work or metallurgical work is imperative.

Transportation of a natural gas containing much nitrogen or carbon dioxide by pipeline presents economic problems. For example, when transporting, say 50,000,000 cubic feet per day of a gas containing 15% by volume of nitrogen through a long pipeline, the operation involves repeated compression of 7,500,000 cubic feet of the inert gas and the construction of the pipeline with a 15% greater capacity than if the impurity were not present. The cost of such compressions may amount to hundreds of thousands of dollars per year. The additional cost of the pipeline may, on the other hand, be greater than the cost of a plant to remove the nitrogen. In addition, the diluting effect of nitrogen and carbon dioxide lowers the heating value, as for example, a gas having a calorific value of say 1050 B. t. u. will be degraded to 945 B. t. u. when containing 10% $N_2$ or $CO_2$. Natural gas must frequently be maintained as 1000 B. t. u. gas, hence the condensible hydrocarbons or natural gasoline content of such a gas cannot be entirely extracted without production of too low a B. t. u. gas.

I propose to treat a hydrocarbon gas containing considerable nitrogen as an impurity, for the removal of this impurity thereby "upgrading" the heating value. By such a procedure all or substantially all the "natural gasoline" hydrocarbons can be extracted from the gas and still maintain a sufficiently high B. t. u. content for satisfactory marketing.

An object of my invention is to provide a process for the removal of relatively large amounts of free nitrogen from natural gas.

Another object of my invention is to provide an economical process for removal of nitrogen from a natural gas.

Still another object of my invention is to provide a process not involving excessively high pressures nor costly low temperatures for the removal of nitrogen from natural gas.

Still other objects and advantages of my process will be apparent to those skilled in such art from a careful study of the following disclosure.

The accompanying drawing forming a part of this disclosure, illustrates diagrammatically one form of apparatus in which the process of my invention may be practiced.

Referring to the drawing, the main units of the process may be identified as follows: a main absorber or nitrogen absorber is referred to by numeral 10, a nitrogen stripper by 15, and ammonia recovery units 20 and 27. Unit 18 is a heater of conventional heat exchange construction while an exchanger 14 is also of conventional design and it is intended to serve as a heater and cooler simultaneously. Unit 40 is a refrigerated chiller intended to furnish sufficient refrigeration to chill the contents of line 13 to a temperature from about −30° to −100° F. This unit may be refrigerated by a propane, ethylene or ammonia system, as desired. Pumps 25, 26 and 29 are conventional transfer and pressure producing pumps so designed and operated as to transfer liquid and increase pressure thereon from about atmospheric to perhaps as high as 1000 pounds per square inch. Valves, such as pressure reducers or flow controllers, etc., as valves 24 and 30 are of conventional design and construction. Liquid level controllers 31, 32 and 33 are also of conventional design.

In the following detailed description of the operation of my process all temperatures given will be in degrees Fahrenheit, and all pressures in pounds per square inch absolute.

In the operation of my process a natural gas containing about 15% by volume from a field line or intermediate storage tank, not shown, enters my system by a line 11 and passes directly into the lower portion of the main or nitrogen absorber 10. It is understood that this gas stock be previously dried since subsequent low temperature steps may freeze out any moisture transferred from the raw gas to the extraction solvent.

The raw, dry gas passes upward through the absorber vessel in counter-current relation to downward flowing liquid ammonia extraction solvent. The pressure maintained in this extractor may be substantially any pressure desired provided it be sufficiently high to effect a proper and efficient solution of nitrogen by the extraction solvent. It will be realized that the higher the pressure the greater will be the solubility of the nitrogen in the liquid ammonia, and of course the converse is true. The lower limit of pressure carried will be determined by the maximum permissible rate of circulation of absorbent ammonia. While pressures as low as 500 pounds per square inch may be used economically or even as high as 1000 pounds, I have found the pressure of approximately 700 pounds to be suitable.

The temperature of this contacting step is relatively high since the solubility of nitrogen in ammonia is greater the higher the temperature. Obviously an upper limit exists for this abnormal increase in solubility, but this upper limit is immaterial because of other considerations, for example, the higher the temperature the greater is the vapor pressure of the liquid ammonia solvent and accordingly carry out of ammonia with the treated hydrocarbon gas is greater. I have found that nitrogen extraction is efficient at from 90° to 100° F. or even between broader units of approximately 70° to 110° F. while the loss of ammonia from the absorber is not excessive at these temperatures under the above mentioned pressures. Thus I prefer to operate my absorber at a pressure of about 700 pounds per square inch at a temperature of about 100° F.

The absorber vessel 10 may be a bubble cap type vessel, or a packed tower or substantially any type contactor provided it permit efficient contacting between the gas and the liquid solvent under the desired temperature and pressure.

While the absorption vessel may be of any desired size and capacity, I am describing the operation of a process for treating about 50,000,000 cubic feet free gas per day of 24 hours, under a pressure of about 700 pounds at a temperature of 100° F. I prefer to circulate liquid ammonia solvent at the rate of approximately 8,000 gallons per minute, and under these conditions the extraction of the nitrogen from the hydrocarbon gas has been substantially complete. Similarly, as other operational conditions may be varied, this circulation rate of absorbent may also be varied within limits while at the same time making compensating adjustments in the other conditions, as is understood by those well skilled in the absorption art.

Enriched absorbent, or nitrogen laden liquid ammonia absorbent leaves the base of the absorber 10 by a line 13, passes through the exchanger 14 for cooling thence through the pressure reduction valve 24 for further cooling and finally reaches the nitrogen stripper vessel 15 at a point near its top. The amount of cooling imparted to this rich absorbent in the exchanger 14 is intended to be such that when taken in conjunction with the fixed amount of cooling through valve 24, the resulting absorbent temperature will be from −30° to −100° F., approximately. On passing through said valve the pressure is reduced from about 700 pounds to about 20-25 pounds per square inch absolute or even less. By this temperature drop and pressure reduction substantially all of the dissolved nitrogen leaves the absorbent since at this temperature nitrogen gas is substantially insoluble in liquid ammonia. The solubility of nitrogen gas in ammonia decreases with decrease in temperature, which effect is just the opposite of normal. The pressure effect is, however, normal, that is the greater the pressure, the greater is the solubility.

In place of chilling the rich absorbent by pressure reduction and subsequent expansion, I may employ the refrigerator 40 to chill the ammonia absorbent with its charge of dissolved nitrogen to a temperature between about −30° and −100° F. This chilled absorbent is then passed through valve 24 which is kept in a substantially wide open condition, into the N₂ stripper 15 which under these conditions is operated at substantially the pressure of the N₂-absorber 10. At this low temperature, the N₂ is evolved in stripper 15, the denuded absorbent then passed through line 17, exchanger 14 and recycled into the absorber 10 by pump 25. In this manner the cost of operation of pump 25 is materially reduced over the cost when stripper 15 is operated at about atmospheric pressure.

The nitrogen gas evolved from the absorbent in stripper 15 issues therefrom through the overhead gas line 16. The temperature of this stripping operation or desorption as it might be called should preferably be carried out at as low a temperature as practical for several reasons, among which are: the lower the temperature the more nearly completely will the nitrogen be desorbed from the ammonia absorbent. The lower the temperature the lower will be the vapor pressure of the ammonia and accordingly less ammonia will be carried away by the evolving or desorbing nitrogen, and since an ammonia recovery unit may be used, less load will be placed on such a recovery unit. It is obvious that said temperature should be below the boiling point of the ammonia at the pressure of operation, and preferably considerably below. The other temperature limit is as obvious as the one just discussed, that is, operation cannot be carried out at a temperature below the freezing point of ammonia. Ammonia boils at about −28° F. and freezes at about −108° F., both under atmospheric pressure.

Liquid ammonia absorbent, free of nitrogen, which accumulates in the base of the stripper, is withdrawn through a lean absorbent line 17 and passed through the exchanger 14 into line 12. Pump 25 serves to effect this lean absorbent transfer substantially from stripper to absorber and in so doing the pressure is raised from about 20 pounds to the absorber pressure of 700 pounds per square inch. The lean absorbent on passing through exchanger 14 becomes warmed substantially and on passing through heater 18 interposed in line 12 is further heated up to about 100° F. or such temperature as desired for best absorption in the absorber 10. Any heating medium desired may be used in heater 18, as for example, warm water, etc.

The stripper 15 may be substantially any type vessel desired, for example, a bubble cap type column, packed or other tower, providing some agitation is imparted to the descending absorbent. Liquid level controller apparatus 33 serves to control the circulation of absorbent in the absorption-stripper system by controlling the operation of the transfer pump 25.

The treated nitrogen free hydrocarbon gas which issues from the absorber through gas line 19 is conducted to an ammonia recovery system 20. This recovery system may be one of conventional design using any satisfactory method or process. For example, the ammonia containing gas may be contacted with water in which the ammonia is easily soluble and the hydrocarbon gas substantially insoluble. The ammonia is then removed from the water, dried, and transferred by pump 26 through a line 22 into line 12 wherein this recovered ammonia joins the main body of absorbent ammonia. This recycle ammonia may be liquefied before or after pressuring by the pump 26. This hydrocarbon-ammonia material may be treated at any pressure desired commensurate with good recovery methods, a valve 30 serving to control the gas inlet pressure.

In like manner the nitrogen gas issuing from the top of stripper 15 through nitrogen line 16 contains ammonia gas and this latter should preferably be extracted for recycling purposes. An ammonia recovery unit similar to that mentioned above and represented diagrammatically and referred to by numeral 27 may be used for this extraction, ammonia suitable for recycle issues therefrom through a line 28, is pressured by a pump 29 and transferred into line 22 and thence into the main ammonia line 12.

Other ammonia extraction systems which are available and which would function properly for the purpose at hand may be used, if desired. One such system which might be used involves the use of methyl alcohol or ethyl alcohol as the ammonia solvent, providing the alcohol losses are not prohibitive.

Nitrogen- and ammonia-free hydrocarbon gas issues as the main product of my process through an outlet line 21 from the ammonia recovery unit for such disposal as desired.

In like manner nitrogen gas, substantially free of hydrocarbon and ammonia, as a secondary product of the process issues from the ammonia stripper 27 by a nitrogen outlet line 35, for disposal as desired.

Makeup ammonia absorbent, if needed, may be introduced into the system through a reagent makeup line 34.

To those skilled in the art it will be obvious that certain vessels, transfer lines and other pieces of apparatus should be well insulated against loss of low temperatures.

From the above description of my process and principles of operation thereof, it will be obvious to those skilled in such art that the process is one of broad application and may be used for the separation of nitrogen from natural gas, refinery gases or individual hydrocarbons or from such gases as hydrogen or carbon monoxide.

What I claim is:

1. In the concentration of nitrogen from gaseous mixtures thereof with hydrocarbon gases consisting essentially of methane, the process comprising contacting the mixture with liquid ammonia.

2. A process for the separation of nitrogen from hydrocarbon gases consisting essentially of methane which comprises contacting a gaseous mixture of nitrogen and said hydrocarbons with liquid ammonia to selectively dissolve the nitrogen and separating the residual gas from the liquid solution containing the nitrogen.

3. A process for purifying a natural gas containing some nitrogen as an impurity comprising the steps of contacting the gas with liquid ammonia at a temperature between the limits of 70° to 110° F. and at a pressure between 500 to 1000 pounds per square inch absolute, separating the contacted gas containing some vaporous ammonia from the liquid ammonia containing dissolved nitrogen, separating ammonia from said separated contacted gas containing same, and recovering the gas as the primary product of the process.

4. A continuous process for purifying a natural gas containing nitrogen as an impurity comprising the steps of contacting the gas with liquid ammonia at atmospheric temperature and at a superatmospheric pressure, separating the contacted gas containing ammonia vapors from the liquid ammonia containing dissolved nitrogen, flashing the dissolved nitrogen from the separated liquid ammonia at a subatmospheric temperature and at atmospheric pressure and recycling the flashed solvent as the first mentioned contacting agent, said flashed nitrogen containing vaporous ammonia, separating this ammonia from the nitrogen, removing said nitrogen as a secondary product of the process and recycling the ammonia into the original contacting step; separating ammonia vapors from above said contacted gas containing same, removing the gas as the primary product of the process and recycling the separated ammonia into the original contacting step.

JOHN W. LATCHUM, JR.

REFERENCES CITED

The following references are of record in the file of this patent:

UNITED STATES PATENTS

| Number | Name | Date |
|---|---|---|
| 1,942,131 | Baumann | Jan. 2, 1934 |
| 1,989,273 | Grimme | Jan. 29, 1935 |
| 2,029,120 | Schilling | Jan. 28, 1936 |

OTHER REFERENCES

"Solubility of $H_2$ and $N_2$ in liquid $NH_3$," Ind. Eng. Chem. 17, 715–16 (1925).

"Solubility of $N_2$ in liquid $NH_3$," J. Am. Chem. Soc. 55, 975–8 (1933).

"Solubility in liquid $NH_3$ of $H_2$ and $N_2$," J. Am. Chem. Soc. 59, 1984–7 (1937).